(12) United States Patent  (10) Patent No.: US 8,144,435 B2
Greminger et al.  (45) Date of Patent: Mar. 27, 2012

(54) COST REDUCED MICROACTUATOR SUSPENSION

(75) Inventors: Michael Allen Greminger, St. Anthony, MN (US); John Stuart Wright, Minneapolis, MN (US); Michael Scott Bowers, Edina, MN (US); Bradley Jay Ver Meer, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 587 days.

(21) Appl. No.: 12/254,671

(22) Filed: Oct. 20, 2008

(65) Prior Publication Data

US 2010/0097726 A1   Apr. 22, 2010

(51) Int. Cl.
  *G11B 5/56*  (2006.01)
(52) U.S. Cl. ............... 360/294.4; 360/294.5; 360/78.12; 360/264.2
(58) Field of Classification Search ............... 360/294.4, 360/294.5, 78.12, 264.2, 265.9
  See application file for complete search history.

(56) References Cited

U.S. PATENT DOCUMENTS

| | | | |
|---|---|---|---|
| 5,805,382 A * | 9/1998 | Lee et al. ............... | 360/244.1 |
| 6,063,508 A | 5/2000 | Hanrahan et al. | |
| 6,233,124 B1 | 5/2001 | Budde et al. | |
| 6,252,743 B1 | 6/2001 | Bozorgi | |
| 6,404,593 B1 | 6/2002 | Iwamoto | |
| 6,597,538 B1 | 7/2003 | Kashima et al. | |
| 6,597,541 B2 | 7/2003 | Nishida et al. | |
| 6,680,825 B1 | 1/2004 | Murphy et al. | |
| 6,731,472 B2 | 5/2004 | Okamoto et al. | |
| 6,885,525 B1 | 4/2005 | Utsunomiya | |
| 6,927,947 B2 | 8/2005 | Shimizu et al. | |
| 7,064,401 B2 | 6/2006 | Uchiyama et al. | |
| 7,159,300 B2 | 1/2007 | Yao et al. | |
| 7,199,978 B2 | 4/2007 | Yao et al. | |
| 7,240,417 B2 | 7/2007 | Yao et al. | |
| 7,292,413 B1 | 11/2007 | Coon | |
| 7,312,955 B2 | 12/2007 | Kuwajima et al. | |
| 7,554,773 B2 * | 6/2009 | Zhu et al. ............... | 360/294.4 |
| 7,624,495 B1 * | 12/2009 | Crowder et al. ......... | 29/603.03 |
| 7,719,798 B2 * | 5/2010 | Yao ............... | 360/294.4 |
| 2001/0043443 A1 | 11/2001 | Okamoto et al. | |
| 2001/0050833 A1 | 12/2001 | Murphy et al. | |
| 2006/0221503 A1 | 10/2006 | Watadani et al. | |
| 2007/0109690 A1 | 5/2007 | Yao et al. | |
| 2008/0024927 A1 | 1/2008 | Hong et al. | |
| 2009/0086379 A1 | 4/2009 | Hanya et al. | |
| 2010/0073824 A1 | 3/2010 | Nojima | |

FOREIGN PATENT DOCUMENTS

| | | |
|---|---|---|
| JP | 60-136978 | 7/1985 |
| JP | 2001-126423 | 5/2001 |
| JP | 2002-050140 | 2/2002 |

* cited by examiner

*Primary Examiner* — David Lam

(74) *Attorney, Agent, or Firm* — Kagan Binder, PLLC (57) ABSTRACT

An improved microactuator suspension is provided for use with high density storage media. The number of microactuator elements is reduced to one and placed perpendicularly to the longitudinal axis of the suspension arm to maximize the windage and resonance performance and minimize the microactuator's contribution to bending stiffness and the off track bending component. An improved electrical connection eliminates the requirement for a jumper. These improvements reduce cost by reducing part count and assembly complexity.

30 Claims, 13 Drawing Sheets

COST REDUCED MICROACTUATOR SUSPENSION

BACKGROUND

The present invention relates to a suspension level microactuator. More particularly, it relates to a microactuator element located on a suspension arm in a disc drive system to selectively move a transducer with respect to a rotatable disc.

The density of data tracks on magnetic disks continues to increase, requiring more precise positioning of the transducer head. Conventionally, head positioning is accomplished by operating an actuator arm with a large scale actuation motor, such as a voice coil motor, to position a head on a flexure at the of the suspension arm. The large scale motor lacks sufficient resolution to effectively accommodate high track density discs. A high resolution head positioning mechanism, or microactuator, is advantageous to accommodate the high density discs.

One design for high resolution head positioning involves using a high resolution microactuator element in addition to the conventional low resolution motor creating a dual stage actuator. Several designs for the use of piezoelectric (PZT) elements as microactuator elements have been proposed but they are costly and complex to design and assemble. There is a need for a lower cost microactuator arrangement.

SUMMARY

The present invention provides for the cost reduction of a microactuator suspension by reducing the number of microactuator elements and improving the electrical connection. An apparatus supports and positions a transducer. The support structure has a major longitudinal axis, a first portion, and second portion that carries the transducer which is movable with respect to the first portion. A single microactuator element is attached between the first and second portion of the support structure. The major axis of the microactuator element is perpendicular to the major longitudinal axis of the support structure. When the microactuator element and the transducer are on the same side of the support structure, the circuit for providing electrical contact is also located on that side. When the microactuator element and the transducer are on opposite sides of the support structure, the circuit is routed to both sides of the support structure to make contact with the microactuator element and the transducer.

BRIEF DESCRIPTION OF THE DRAWINGS

FIG. 7b is the bottom view of the single microactuator suspension shown in FIG. 7a.

FIG. 8 is the perspective view of the single microactuator suspension shown in FIG. 7a.

DETAILED DESCRIPTION

Figure 1:
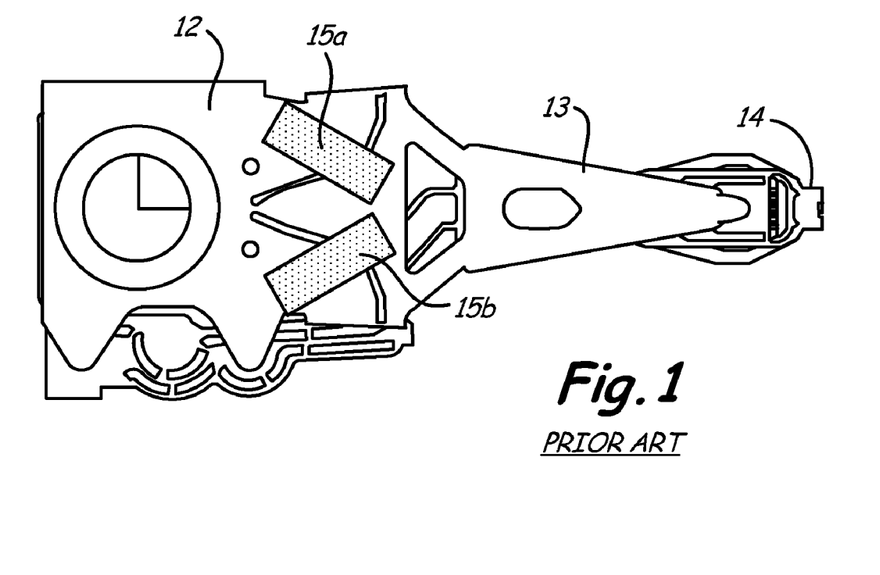
FIG. 1 is a top view of a longitudinally symmetrical dual microactuator suspension.

FIG. 1 is a top view showing an example of a dual microactuator design for a disc drive. A voice coil motor (not shown) rotates first suspension arm portion 12 and second suspension arm portion 13 to position transducer head 14 close to its desired position. Microactuator elements 15a and 15b additionally deflect second suspension arm portion 13 and transducer head 14 for fine position control.

The use of a dual stage actuator is limited by the significant increase in part cost incurred by including the microactuator technology. Factors that lead to this increased cost are the increased number of required components and the increased assembly complexity. For a dual stage actuator, these additional components are generally two microactuator elements and an electrical interconnect jumper. The jumper is required to provide an electrical connection because the microactuator and transducer are on opposite sides of the suspension arm. In designs where they are on the same side, the jumper is still required to make a connection to the top microactuator element contact due to the height of the microactuator element. In many cases, the microactuator element is a piezoelectric element, such as lead-zirconium-titanate (PZT). To reduce cost and complexity, according to various embodiments of the present invention, the number of microactuator elements can be reduced to one and the electrical interconnect improved by eliminating the need for a jumper.

Single Microactuator Element

Figure 2:
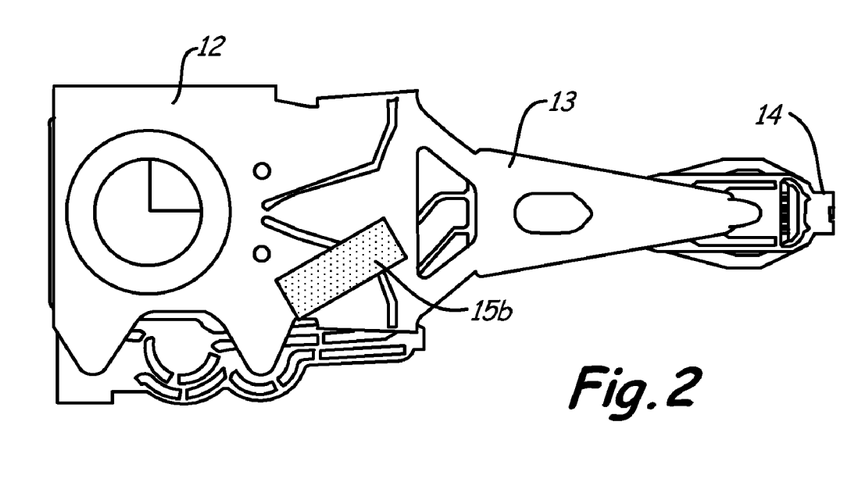
FIG. 2 is a top view of a microactuator suspension with one microactuator removed.

FIG. 2 is a top view showing the conventional dual microactuator design of FIG. 1 with microactuator element 15a removed so that it is now a single microactuator element design. A single microactuator element design such as this one suffers from two primary side effects. The first impact of removing one microactuator element is a decrease in actuator stroke to one half of the dual microactuator design. The second impact is that a single microactuator element design is necessarily asymmetric which impacts resonance and windage performance. The present invention addresses these problems to provide single microactuator element designs that minimize the negative effects of the suspension asymmetry while maintaining stroke that is as high as possible.

The single microactuator element design requires either an asymmetric suspension arm, asymmetric positioning of the microactuator element, or both to allow the microactuator element to deflect the transducer head. In order to maximize the windage and resonance performance, preferred embodiments constrain one to be symmetric. Additionally, the microactuator element is placed to minimize its contribution to the bending stiffness of the suspension arm. Minimizing the microactuator element's contribution to bending stiffness has the negative side effect of lowering the stroke attainable by the design, but has the positive side effect of reducing the microactuator element load share. Load share is defined as the percent of the total suspension preload supported by the microactuator element. Benefits of reducing the microactuator element load share include increased robustness of the microactuator element die to breaking due to less stress in the part, reduced stiffness variation, and reduced resonance performance variation.

Symmetric Suspension

Figure 3:
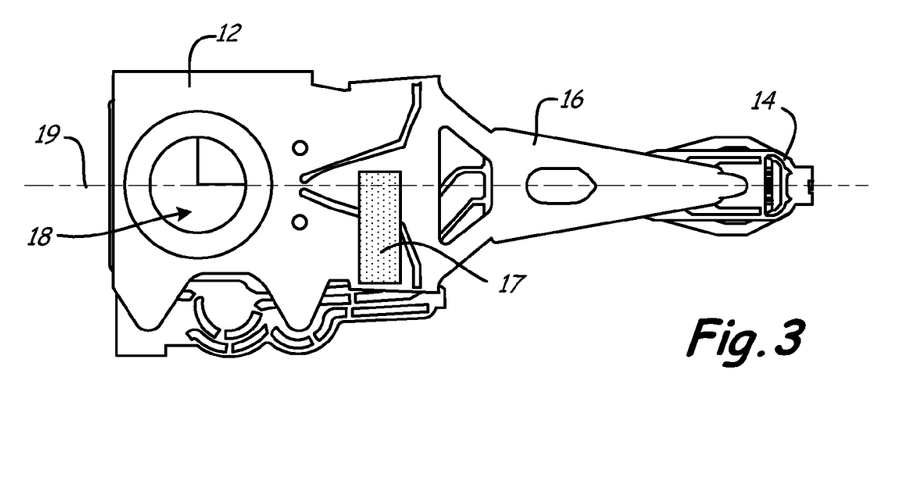
FIG. 3 is a top view of an improved single microactuator suspension where the microactuator is placed perpendicularly to the longitudinal axis of the suspension.

FIG. 3 is a top view showing an embodiment of the present invention where single microactuator element 17 is positioned generally perpendicular to symmetrical suspension arm 16. Suspension arm 16 is symmetrical so that all of the required asymmetry comes from the asymmetric placement of single microactuator element 17. Single microactuator element 17 is oriented perpendicular to longitudinal axis 19 (although it should be understood that an angle of exactly 90 degrees is not required), and is located adjacent to swage boss region 18 where first suspension arm portion 12 is attached to the actuator arm (not shown), preferably as close to swage boss region 18 as possible in view of overall design constraints, to minimize its contribution to the bending stiffness of the suspension. Table 1 shows the improved performance of this embodiment.

TABLE 1

Performance Improvement for Single Microactuator Element Design

| | | Dual Design (FIG. 1) | Single Design (FIG. 2) | Improved Single Design (FIG. 3) |
|---|---|---|---|---|
| Spring Rate | (gmf/in) | 63.63 | 61.3 | 56.7 |
| Static Shock | (G/gmf) | 333 | 333 | 330 |
| Microactuator Element Load Share | (%) | 9.9 | 6.4 | 1.6 |
| Stroke | (nm/volt) | 13.5 | 6.6 | 4.3 |
| Mass | (mg) | 39.4 | 37.7 | 38.4 |
| Suspension 1st Bending | (kHz) | 5.1 | 5.1 | 5.0 |
| Suspension 1st Torsion | (kHz) | 7.9 | 8.4 | 8.0 |
| Gimbal 1st Torsion | (kHz) | 19.9 | 17.7 | 16.9 |
| Sway | (kHz) | 15.6 | 14.2 | 13.6 |
| Suspension Bending Offtrack Coupling (delta y/delta x) | (%) | 2.7 | 78.6 | 1.0 |
| PZT Width | (inches) | 0.040 | 0.040 | 0.046 |
| PZT Length | (inches) | 0.089 | 0.089 | 0.090 |

The improved single microactuator element design has many advantages including a reduction in microactuator element load share to 1.6% and a substantial reduction of the off track coupling over the unimproved single microactuator element design from 78.6% to 1% all while maintaining an acceptable stroke of 4.3 nm/volt.

Figure 4:
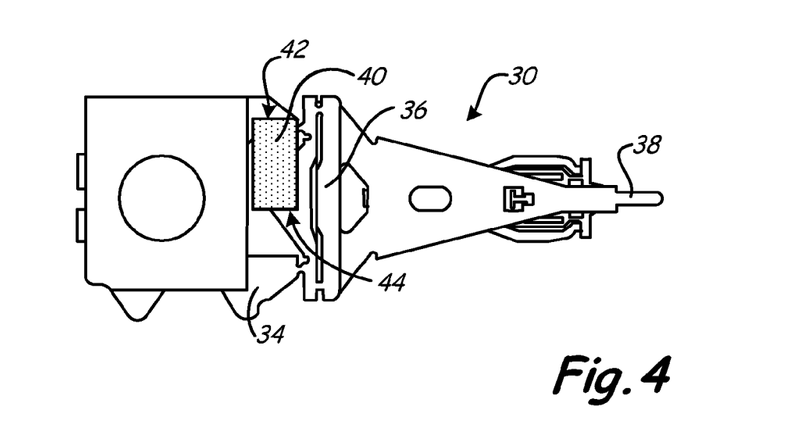
FIG. 4 is a top view of an improved single microactuator suspension with an alternative motor structure.

Another embodiment with an asymmetrically placed single microactuator element is shown in FIG. 4. Suspension arm 30 has two portions. First portion 34 is secured to a large scale positioning motor such as a voice coil motor (not shown). Second portion 36 carries transducer head 38. First portion 34 and second portion 36 of suspension arm 30 are movable with respect to each other by operation of microactuator 40. Microactuator element 40 is secured to first portion 34 at region 42 and to second portion 36 at region 44.

Figure 5:
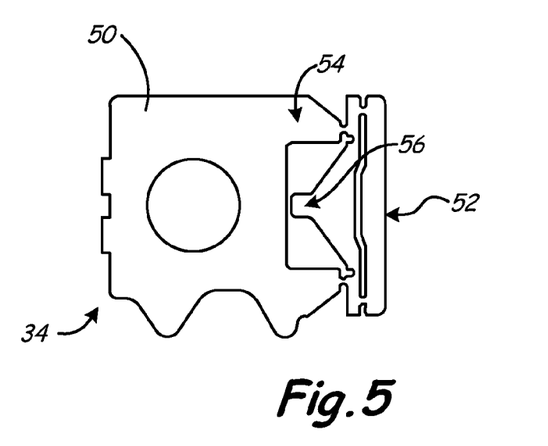
FIG. 5 is an enlarged top view of the motor structure for a single microactuator suspension.
Figure 6A:
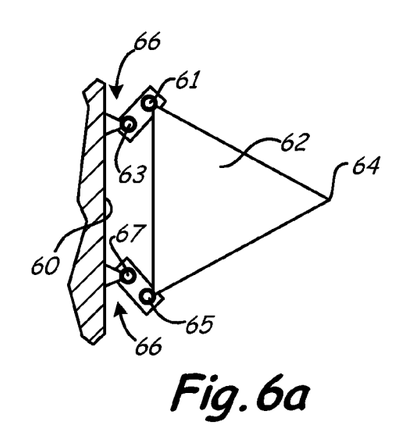
FIG. 6a is a schematic diagram representing the motor structure for a single microactuator suspension.
Figure 6B:
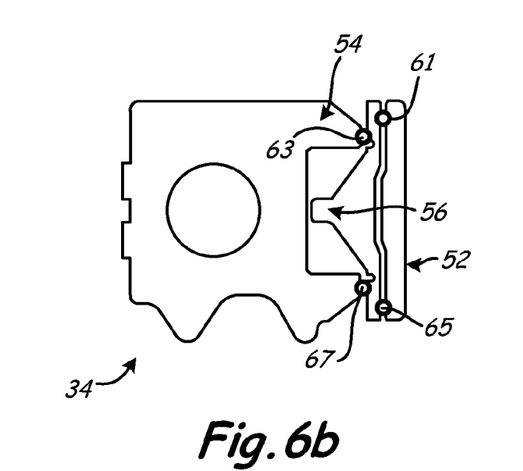
FIG. 6b is an enlarged top view of the motor structure for a single microactuator suspension showing the pivot points of the four bar mechanism.

FIG. 5 is an enlarged top view showing first portion 34 of suspension arm 30 (FIG. 4). The microactuator element is attached at regions 54 and 56. This allows high precision positioning of region 52. FIG. 6a is a schematic diagram illustrating this positioning mechanism. Solid 60 represents first portion 50 of FIG. 5. Triangle 62 represents a second portion (such as second portion 36 of FIG. 4) which carries the transducer at tip 64. Triangle 62 is movable with respect to solid 60 by operation of four bar mechanism 66 using pivot points 61, 63, 65, and 67. Operating this mechanism allows high precision positioning of tip 64. FIG. 6b is an enlarged top view of first portion 34 of suspension arm 30 as in FIG. 5 additionally showing pivot points 61, 63, 65, and 67 of the four bar mechanism.

Symmetric Placement

Figure 7A:
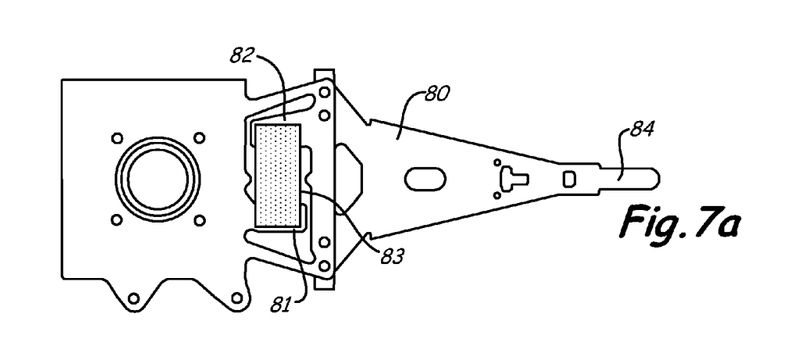
FIG. 7a is a top view of an improved single microactuator suspension where the microactuator is recessed and placed symmetrically about the longitudinal axis of suspension.
Figure 7B:
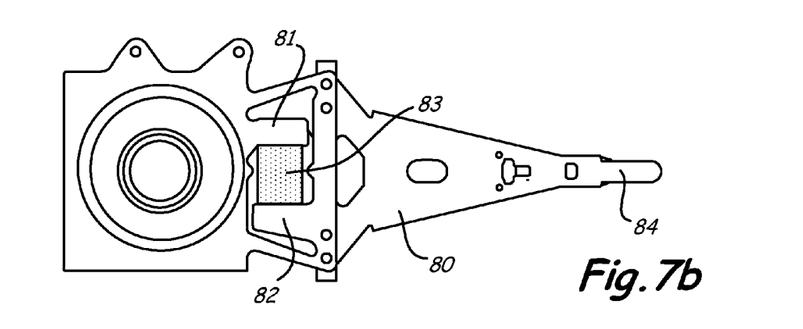
Figure 8:
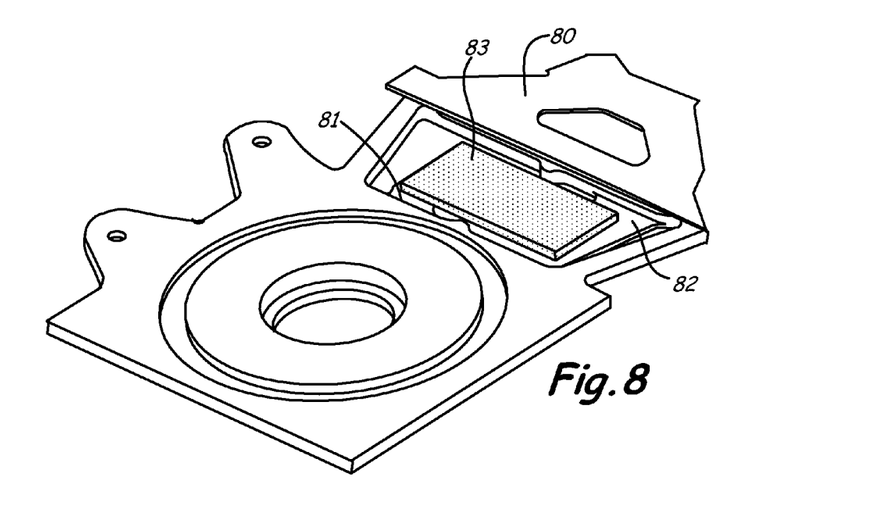

FIG. 7a is a top view, FIG. 7b is a bottom view, and FIG. 8 is a perspective view of an embodiment of the present invention where the microactuator element is placed symmetrically on an asymmetrical suspension arm. Suspension arm 80 has asymmetrical mounting tabs 81 and 82 for single microactuator 83 which is located symmetrically about the longitudinal axis of suspension arm 80. Single microactuator element 83 can then deflect transducer head 84 due to asymmetrical mounting tabs 81 and 82. When microactuator element 83 is extended, a force is applied to mounting tabs 81 and 82 spreading them apart. This causes suspension arm 80 and transducer head 84 to be deflected towards mounting tab 81. Similarly, when microactuator element 83 is retracted, mounting tabs 81 and 82 are drawn closer causing transducer head 84 to be deflected towards mounting tab 82. Stiffness and microactuator element load sharing are reduced by recessing microactuator 83 and mounting tabs 81 and 82 into suspension arm 80, as can be seen in FIG. 8. This embodiment provides a stroke of 6.3 nm/volt, a first bending moment of 5.4 kHz, and a first torsion moment of 8.2 kHz.

Improved Electrical Interconnect

Figure 9:
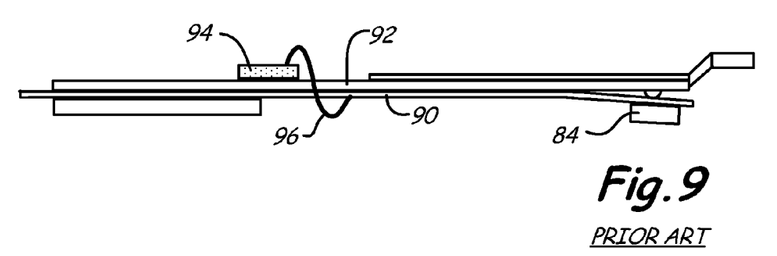
FIG. 9 is a side view of a single microactuator suspension where the microactuator and transducer head are on opposite sides of the suspension requiring a jumper to provide the electrical connection.

The electrical interconnect for an actuator must reach both the microactuator element and the transducer head. FIG. 9 is a side view showing a typical arrangement where transducer head 84 and circuit 90 are located on the bottom of suspension arm 92. Microactuator element 94 is positioned on top of suspension arm 92 and requires jumper 96 to make electrical connection from microactuator element 94 to circuit 90.

This jumper adds cost both because it is an additional component and because it increases the complexity of the assembly process. The present invention addresses this problem by either relocating the microactuator element to the same side of the suspension as the circuit and the transducer head, or by routing the circuit in a way that allows electrical contact to both the microactuator element and the transducer head.

Figure 10:
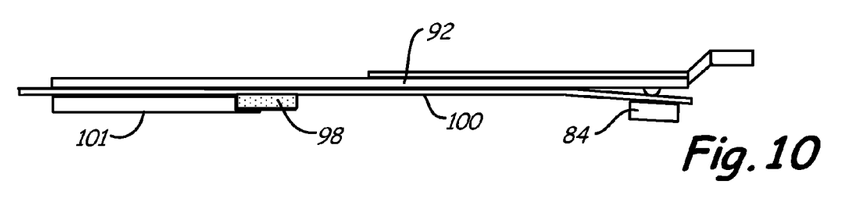
FIG. 10 is a side view of a single microactuator suspension where the microactuator and transducer head are on the same side of the suspension.

FIG. 10 is a side view showing an embodiment where transducer head 84 and microactuator element 98 are on the same side of suspension arm 92 so that both can make contact with circuit 100. This arrangement requires a modification of the proximal end of suspension arm 92 (often referred to as the base plate) at location 101 such that there is sufficient room to place microactuator element 98. The base plate in many previous designs covered the entire lower portion of the mounting area in order to increase the stiffness of the suspension. A space is made in the base plate to accommodate the microactuator element.

Figure 11:
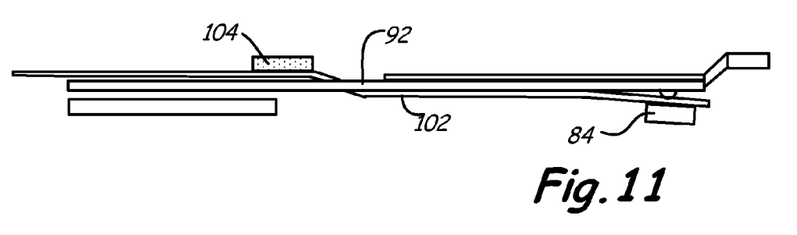
FIG. 11 is a side view of a single microactuator suspension where the microactuator and transducer head are on opposite sides of the suspension and the circuit is routed to both sides.
Figure 12A:
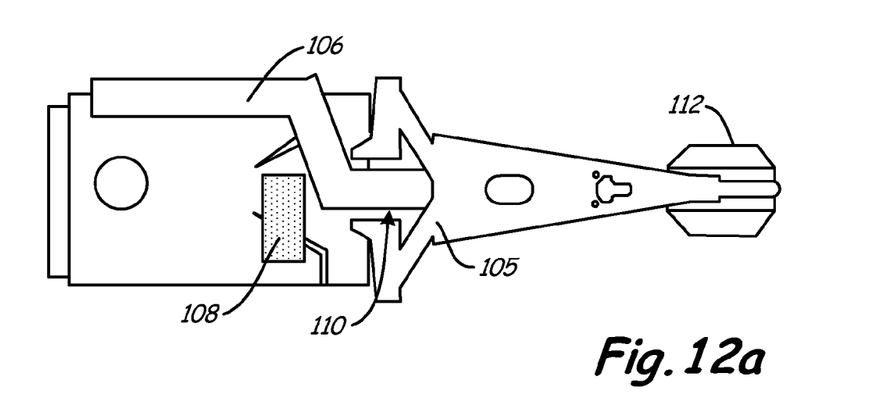
FIG. 12a is a top view of an assembled suspension arm where the circuit is routed to both sides of the suspension and the microactuator is placed perpendicular to the longitudinal axis of the suspension.
Figure 12B:
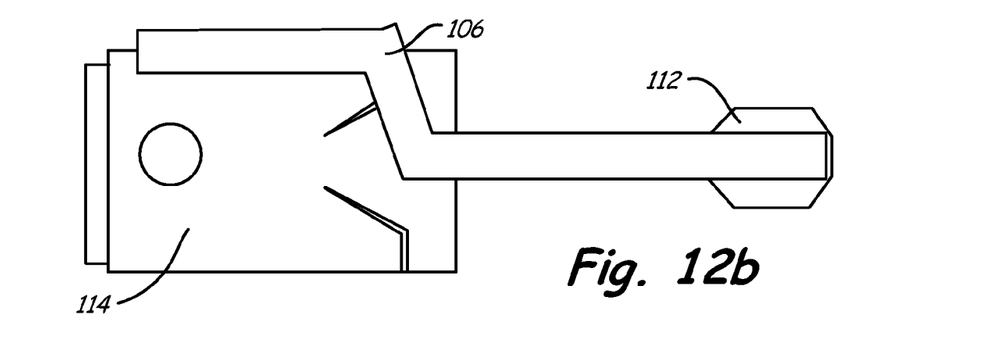
FIG. 12b is a top view of a partially assembled suspension arm where the circuit is routed to the transducer head.
Figure 12C:
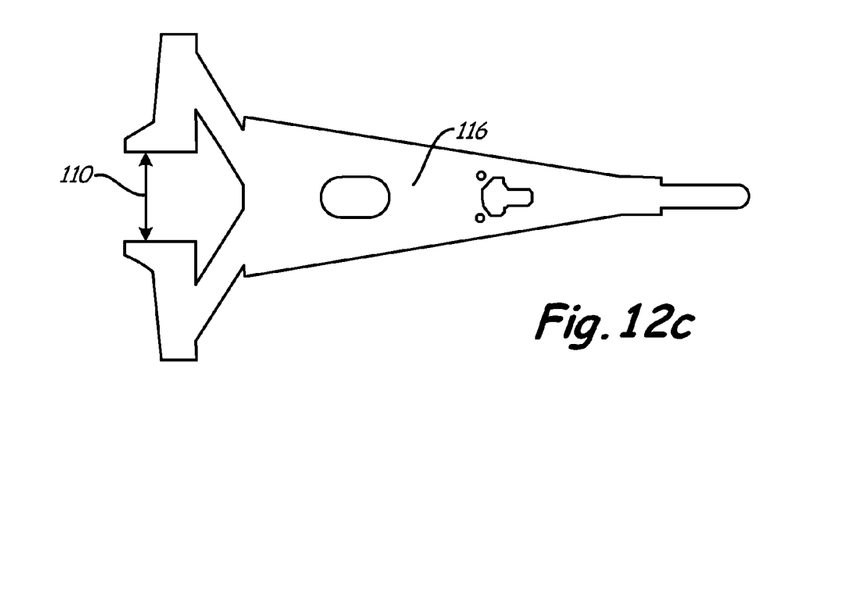
FIG. 12c is a top view of a portion of a suspension arm that includes an aperture to accommodate passing the circuit from the first side of the suspension to the second side of the suspension.
Figure 12D:
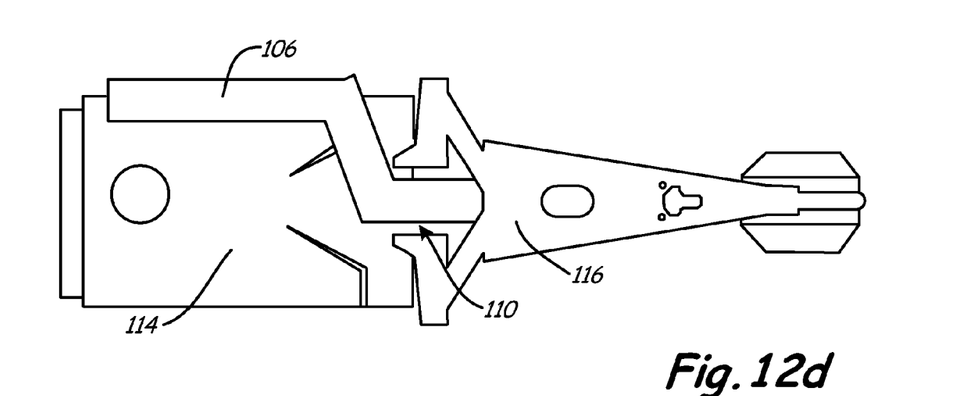
FIG. 12d is a top view of a partially assembled suspension arm where the circuit is routed from the first side of the suspension to the second side of the suspension.

FIG. 11 is a side view showing an embodiment where transducer head 84 and microactuator element 104 are on opposite sides of suspension arm 92, and circuit 102 is routed from the side of suspension arm 92 with microactuator element 104 to the side of suspension arm 92 with transducer head 84. One method to complete this routing is shown in FIG. 12. FIG. 12a shows suspension arm 105 with circuit 106 passing from the same side as microactuator element 108 through aperture 110 to gimbal 112. The transducer head is on the lower surface, not visible, of gimbal 112. This assembly process begins as shown in FIG. 12b with gimbal 112 attached to circuit 106 which is placed over suspension mounting portion 114. Suspension arm portion 116 has aperture 110 which is large enough to allow circuit 106 to pass through it. Arm portion 116 is then placed over circuit 106, leaving aperture 110 and connecting arm portion 116 to mounting portion 114 as shown in FIG. 12d. Mounting portion 114 and arm portion 116 are then secured together using a method such as welding or gluing. Finally, microactuator 108 is placed to complete the assembly. This method results in the circuit traces on circuit 106 being located in close proximity to mounting portion 114 which is generally metallic. A cover layer which is robust enough to protect the traces from contact with mounting portion 114 is used over the circuit traces on circuit 106.

Microactuator Element on Same Side as Transducing Head

Figure 13:
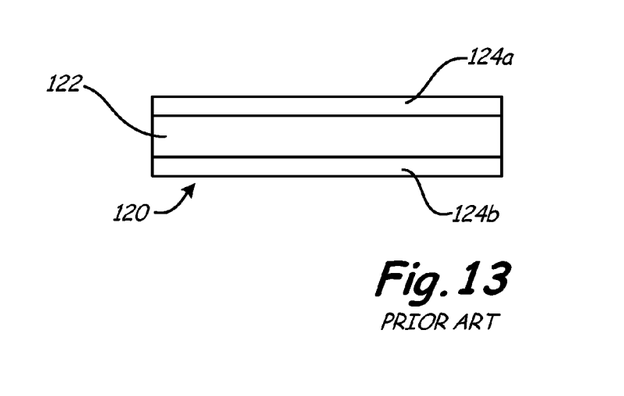
FIG. 13 is a side view of a piezoelectric microactuator element showing the configuration of the contacts and piezoelectric material.

Placing the microactuator on the same side of the suspension arm as the transducer head is not sufficient to eliminate the extra jumper. FIG. 13 is a side view showing typical microactuator 120. Piezoelectric material 122 is located between electrical contacts 124a and 124b. If microactuator 120 is placed on a circuit, a direct connection can be made to one of contacts 124a or 124b. Another method is required to make contact with the other contact that preferably does not use a jumper.

Figure 14:
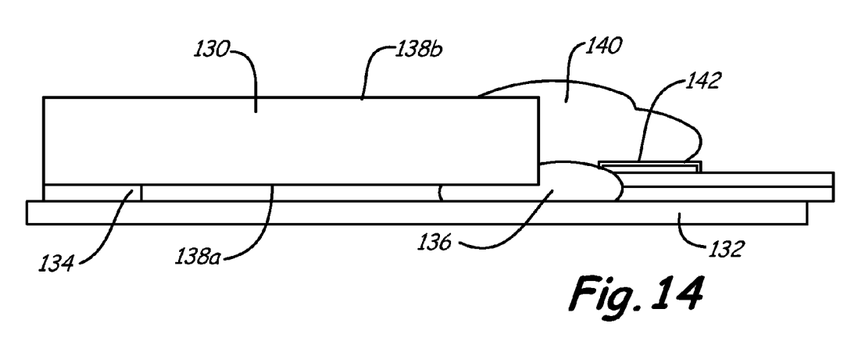
FIG. 14 is a side view of a microactuator connection where nonconductive adhesive forms an insulative barrier to the bottom microactuator contact and conductive adhesive provides the electrical connection to the top contact of the microactuator.

FIG. 14 is a side view showing an embodiment that illustrates one method to make this connection. Microactuator element 130 is secured to circuit 132 with conducting adhesive 134 and non-conducting adhesive 136. This serves to make electrical contact between circuit 132 and microactuator element contact 138a. Sufficient non-conducting adhesive 136 is applied to cover microactuator element contact 138a and create an insulative barrier at that location. Conductive adhesive 140 is then applied over the insulative barrier created by non-conducting adhesive 136 to complete an electrical connection between circuit trace 142 and microactuator element contact 138b. A material suitable for use as a conductive adhesive is thermal cure silver filled epoxy. Thermal cure silica filled epoxy and UV cure silica filled epoxy are suitable for use as a non-conducting adhesive. In this way, electrical contact for both contacts 138a and 138b of microactuator element 130 is achieved without the use of a jumper.

Figure 15:
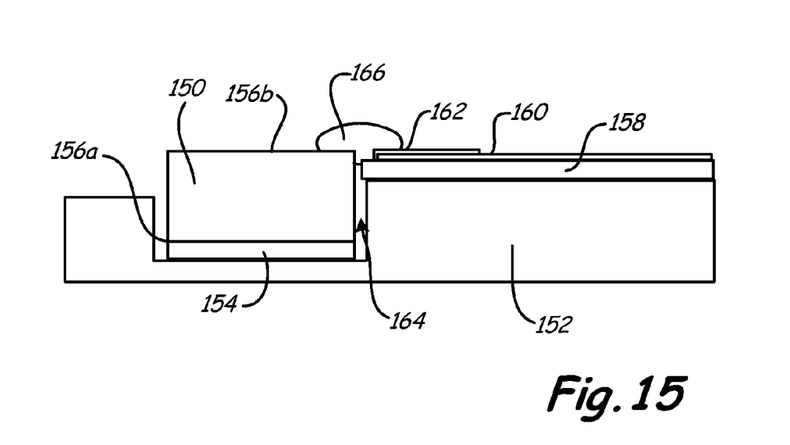
FIG. 15 is a side view of a microactuator connection where the microactuator is recessed and a conductive joint bridges an air gap to provide an electrical connection between the circuit and the top contact of the microactuator.

An alternative to creating a connection that extends from the circuit to the far contact is to recess the microactuator element as shown in FIG. 15. Microactuator element 150 is secured to suspension arm 152 using conductive adhesive 154 in a recessed pocket formed in suspension arm 152. The pocket may be formed by a variety of methods including chemical etching and mechanical milling. The depth of the pocket is slightly less than the thickness of microactuator element 150. For example, a microactuator element with a thickness of 0.004 inches (0.10 mm) will use a recess approximately 0.003 inches (0.08 mm) deep. Electrical contact to microactuator element contact 156a is provided by a conductive path through conductive adhesive 154 and suspension arm 152. Generally, suspension arm 152 is tied to ground. Insulating layer 158 is then placed on the surface of suspension arm 152 followed by circuit 160 with traces 162 near microactuator element 150. Gap 164 insulates microactuator element 150 from contacting suspension arm 152, insulating layer 158 and circuit 160. Conductive joint 166 is then applied to make connection between circuit trace 162 and microactuator element contact 156b. Gap 164 is small enough so that conductive joint 166, often a solder ball, can bridge it.

Figure 16:
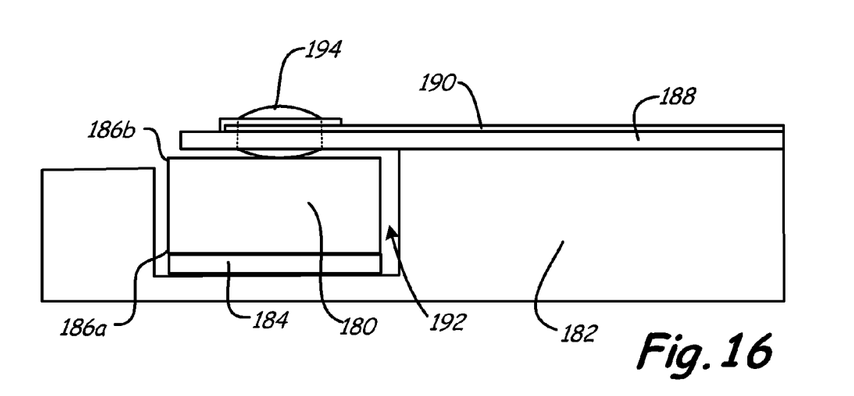
FIG. 16 is a side view of a microactuator connection where the circuit extends over an air gap and a conductive joint provides an electrical connection between the circuit and the top contact of the microactuator.

Another embodiment does not require bridging the air gap with a conductive adhesive. FIG. 16 is a side view showing an electrical interconnect with microactuator element 180 secured to suspension arm 182 using conducting adhesive 184 in a recessed pocket in suspension arm 182. This secures the connection to microactuator element contact 186a. Insulating barrier 188 is located between circuit 190 and suspension arm 182 to prevent unwanted electrical contact. Circuit 190 then extends over air gap 192 to microactuator element 180. Conducting adhesive 194 then provides the connection to microactuator contact 186b.

Figure 17:
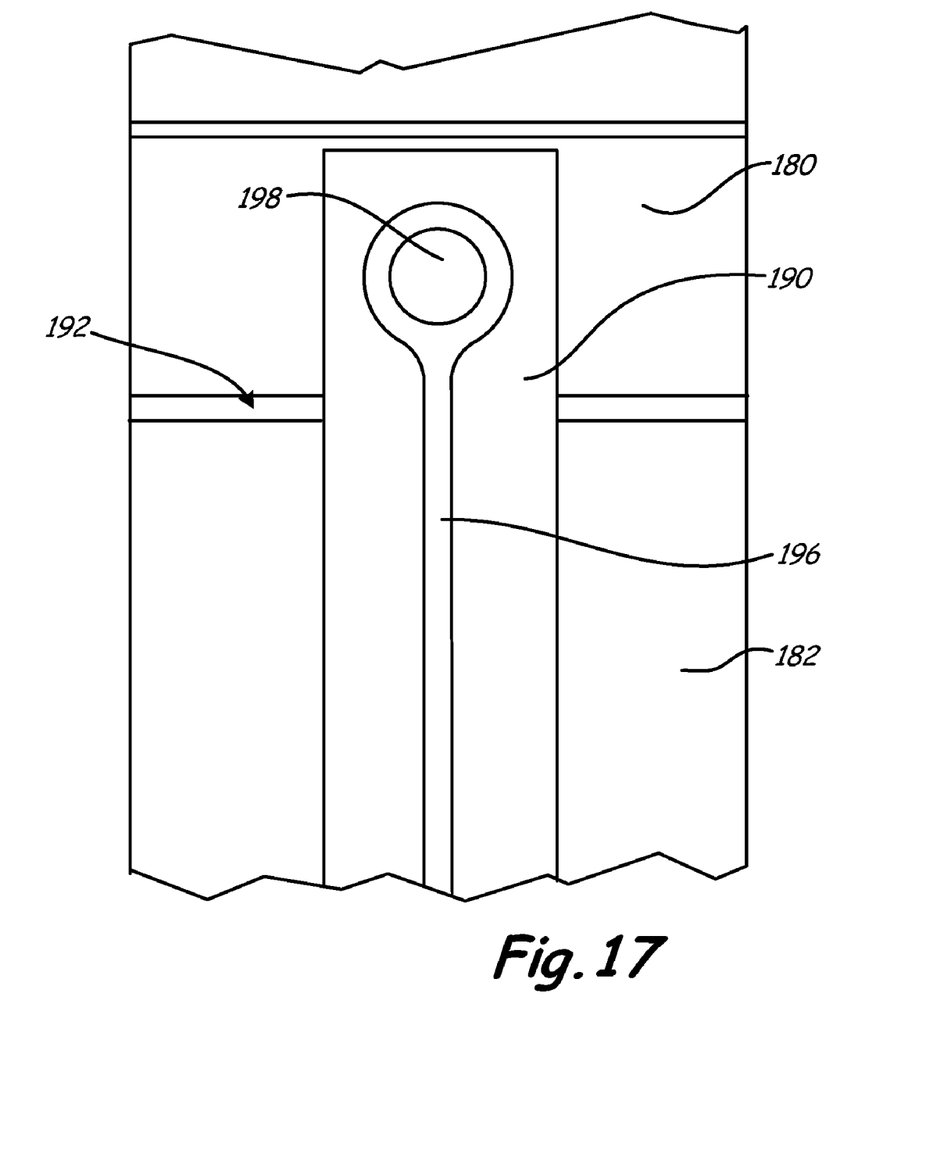
FIG. 17 is a top view of a microactuator connection where the circuit extends over an air gap and a conductive joint provides an electrical connection between the circuit and the top contact of the microactuator.

FIG. 17 is a top down view which better shows this connection. Circuit 190 extends from suspension arm 182 over air gap 192 to microactuator element 180. Aperture 198 in circuit 190 is located over microactuator element contact 186b. Circuit trace 196 on circuit 190 is adjacent to aperture 198. Conducting adhesive 194 (not shown in FIG. 17) is then applied over aperture hole to provide an electrical connection between circuit trace 196 and microactuator element contact 186b.

Microactuator Element on Opposite Side from Transducing Head

Figure 18A:
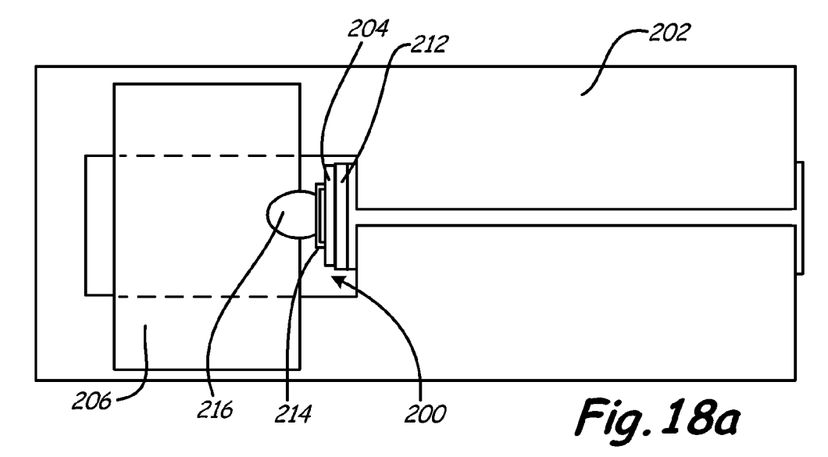
FIG. 18a is a top view of a microactuator connection where the circuit is bent and passed through an aperture in the suspension to provide an electrical connection to the micro actuator.
Figure 18B:
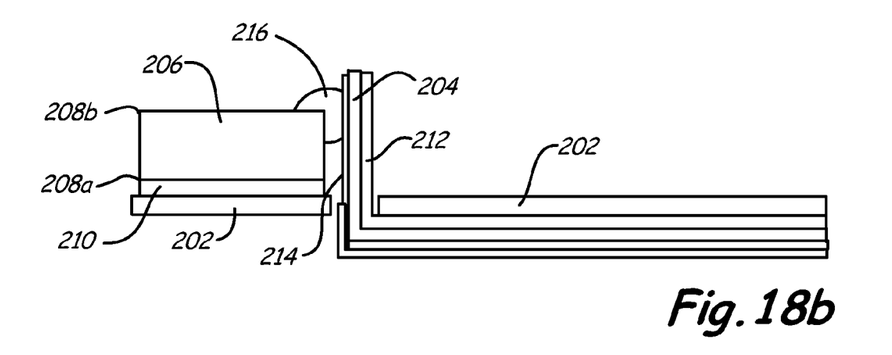
FIG. 18b is a side view of a microactuator connection where the circuit is bent and passed through an aperture in the suspension to provide an electrical connection to the micro actuator.

When the microactuator element and transducing head are on opposite sides of the suspension arm, the jumper can be eliminated by routing the circuit itself such that it can make contact with the microactuator element contacts. One method to accomplish this is shown in FIGS. 18a (top view) and 18b (side view) where aperture 200 in suspension arm 202 allows for circuit 204 to be routed such that a jumper is not needed. Microactuator element 206 has lower contact 208a and upper contact 208b. The connection to lower contact 208a is made through conducting adhesive 210 to suspension arm 202. Circuit 204 is connected to semi-rigid metal 212. One suitable metal is a thin layer of stainless steel. Semi-rigid metal 212 is bent such that it extends from the side of suspension arm 202 opposite to microactuator element 206 to the same side as microactuator element 206. Circuit trace 214 on circuit 204 is now oriented near microactuator element contact 208b and secured with conducting adhesive 216.

Figure 19A:
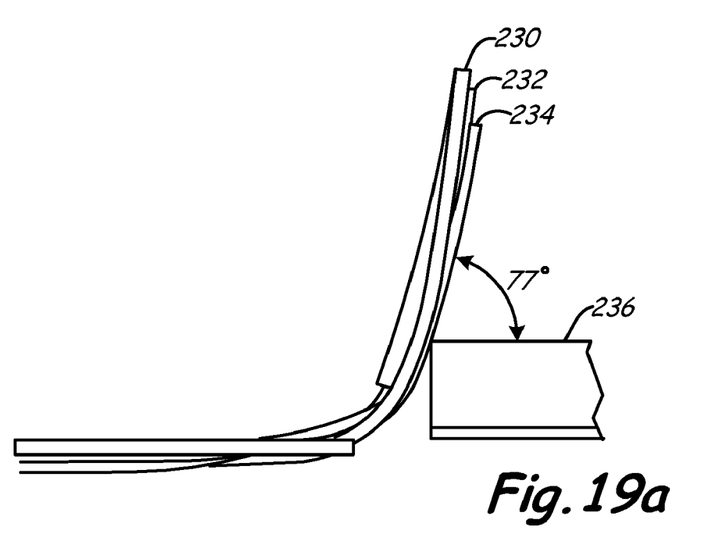
FIG. 19a is a side view of a microactuator connection where the circuit is bent and passed through an aperture in the suspension arm where the semi-rigid metal support the circuit has an aperture that reduces stress on the circuit.
Figure 19B:
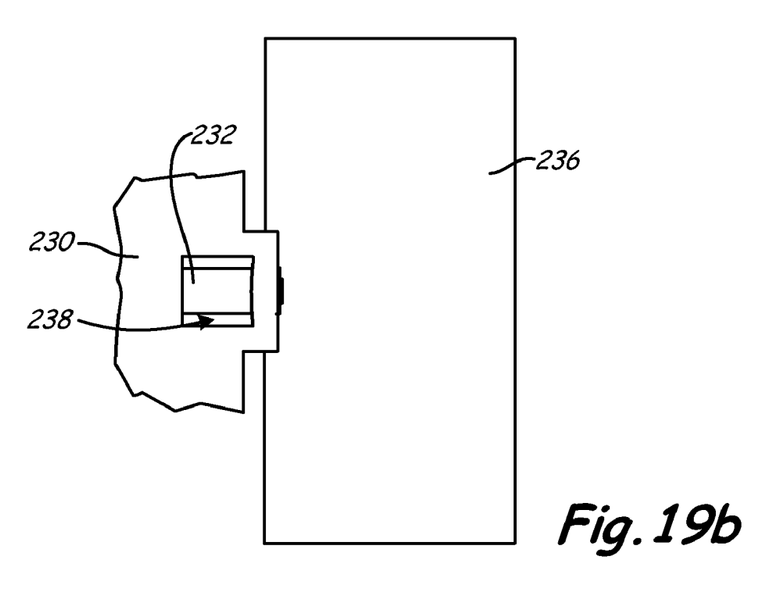
FIG. 19b is a top side view of a microactuator connection where the circuit is bent and passed through an aperture in the suspension arm where the semi-rigid metal support the circuit has an aperture that reduces stress on the circuit.

Depending on the thickness and type of materials used for semi-rigid metal 212, circuit 204 and circuit trace 214, forming the bend may present the possibility of trace breakage. A number of techniques can reduce this. FIG. 19a is a side view showing semi-rigid metal 230, circuit 232, and circuit trace 234 shaped to form a 77 degree angle with the surface of microactuator 236. FIG. 19b is a top view of this same arrangement where aperture 238 of semi rigid metal 230 is visible. The aperture is large enough to reduce the pressure exerted on circuit 232 and circuit trace 234 which reduces trace breakage. A range of bend angles will accommodate the present invention depending on the precise location of the parts in a specific embodiment. Generally, the range of 45-125 degrees or more preferably 65-85 degrees is sufficient. During manufacture, this bend can be created after the circuit portion of the suspension has already been placed. If this approach is used, the suspension arm must have an opening in it large enough to allow the forming tool to pass through and make the bend.

Figure 20:
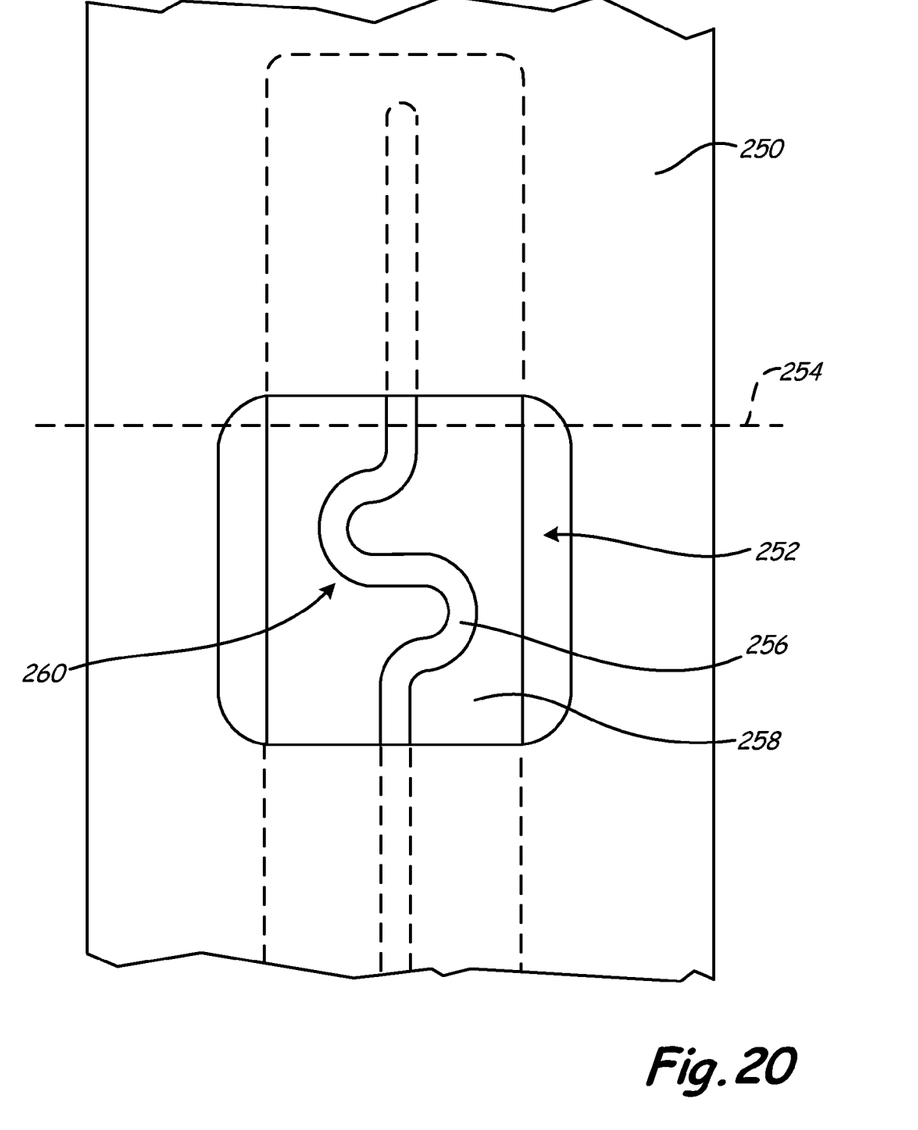
FIG. 20 is a drawing of an electrical interconnect where the circuit traces include a zig zag pattern that increases trace flexibility.

Another technique to reduce trace breakage is shown in FIG. 20. Semi-rigid metal 250 with aperture 252 is bent at bend line 254. Circuit trace 256 on circuit 258 has a zig-zag pattern 260 within aperture 252 and near bend line 254. This allows circuit trace 256 to have more flexibility and resist trace breakage.

The present invention improves the microactuator suspension by reducing part count and assembly complexity. The number of microactuator elements is reduced to one and placed generally perpendicular to the longitudinal axis of the suspension arm to maximize windage and resonance performance and minimize the microactuator element's contribution to bending stiffness and the off track bending component. The electrical interconnect is improved by eliminating the requirement for a jumper. This improvement is applicable to microactuator element suspensions with any number of microactuator elements.

Although the present invention has been described with reference to preferred embodiments, workers skilled in the art will recognize that changes may be made in form and detail without departing from the spirit and scope of the invention.

The invention claimed is:

1. An apparatus for supporting and positioning a transducer, the apparatus comprising:
   a support structure arranged to carry the transducer, the support structure having a major longitudinal axis and including a first portion and a second portion for carrying the transducer that is movable with respect to the first portion; and
   a single microactuator element attached between the first portion of the support structure and the second portion of the support structure, the microactuator element having a major axis extending from the first portion of the support structure to the second portion of the support structure, where the major axis of the single microactuator element and the major longitudinal axis of the support structure are perpendicular;
   wherein the single microactuator element is the only microactuator element in the apparatus.

2. The apparatus of claim 1 wherein the microactuator element comprises a piezoelectric element.

3. The apparatus of claim 1 wherein the support structure is longitudinally symmetric.

4. The apparatus of claim 1 wherein the microactuator element is located symmetrically with respect to the longitudinal axis of the support structure.

5. The apparatus of claim 1 wherein the microactuator is recessed in the support structure.

6. The apparatus of claim 1 wherein the support structure further comprises a four bar mechanism between the first and second portion.

7. The apparatus of claim 1 wherein the apparatus further comprises a swage boss region located on the first portion of the support structure and the microactuator is located adjacent to the swage boss region.

8. The apparatus of claim 1 wherein the apparatus further comprises a circuit adapted to provide electrical connection to the transducer and the microactuator.

9. The apparatus of claim 8 wherein the support structure has a first and second major surface and the circuit, the microactuator, and the transducer are on the first major surface.

10. The apparatus of claim 8 wherein the support structure has a first and second major surface, the transducer is located on the first major surface, the microactuator is located on the second major surface, and the circuit is routed from the first major surface to the second major surface.

11. The apparatus of claim 10 wherein the support structure further comprises an aperture and the circuit is routed through the aperture.

12. An apparatus for supporting and positioning a transducer, the apparatus comprising:
   a support structure arranged to carry the transducer, the support structure having a first major surface, a second major surface, a first portion and a second portion for carrying the transducer that is movable with respect to the first portion, the support structure being configured to carry the transducer on the second major surface;
   a microactuator apparatus for adjusting a position of the second portion of the support structure with respect to the first portion, the microactuator apparatus being located on the second major surface of the support structure; and
   a circuit on the second major surface of the support structure for making electrical contact with the microactuator apparatus and the transducer.

13. The apparatus of claim 12 wherein the circuit is flexible.

14. The apparatus of claim 12 wherein the microactuator apparatus comprises at least one piezoelectric element.

15. The apparatus of claim 12 wherein the support structure has a conductive surface, and the apparatus further comprises:

a first conductive adhesive joint and a nonconductive adhesive joint used to secure a first contact of the microactuator apparatus to the conductive surface of the support structure; and a second conductive adhesive joint applied over the nonconductive adhesive joint for making electrical contact with the circuit and a second contact of the microactuator apparatus.

16. The apparatus of claim 15 wherein the first and second conductive adhesive joints comprise thermal cure silver filled epoxy.

17. The apparatus of claim 15 wherein the nonconductive adhesive joint comprises thermal cure silica filled epoxy or UV cure silica filled epoxy.

18. The apparatus of claim 12 wherein the support structure has a conductive surface, and the apparatus further comprises:

a first and second contact on the microactuator apparatus; and a first conductive adhesive joint used to secure the microactuator apparatus to the support structure making electrical contact to the first contact;

wherein the circuit extends from the support structure to the second contact on the microactuator apparatus and is secured with a second conductive adhesive joint.

19. The apparatus of claim 18 wherein the circuit further comprises an opening positioned over the microactuator to provide access to the second contact, and the second conductive adhesive joint extends into the opening.

20. The apparatus of claim 18 wherein the microactuator apparatus is recessed into the support structure.

21. The apparatus of claim 20 wherein the depth to which the microactuator is recessed is approximately the thickness of the microactuator apparatus.

22. The apparatus of claim 12 wherein the support structure includes a recess and has a conductive surface in the recess, and the apparatus further comprises:

a first and second contact on the microactuator apparatus;

a first conductive adhesive joint used to secure the microactuator apparatus to the support structure in the recess making electrical contact to the first contact; and an airgap between the microactuator apparatus and the support structure;

wherein the circuit is adjacent to the airgap and a second conductive adhesive joint makes electrical contact between the circuit and the second contact of the microactuator apparatus.

23. The apparatus of claim 22 wherein the second conductive adhesive joint is a solder ball.

24. The apparatus of claim 22 wherein the depth of the recess is approximately the thickness of the microactuator apparatus.

25. An apparatus for supporting and positioning a transducer, the apparatus comprising:

a support structure arranged to carry the transducer, the support structure having a first major surface, a second major surface, a first portion and a second portion for carrying the transducer that is movable with respect to the first portion, the support structure being configured to carry the transducer on the second major surface;

a microactuator apparatus for adjusting a position of the second portion of the support structure with respect to the first portion, the microactuator apparatus being located adjacent the first major surface of the support structure; and a flexible circuit routed from the microactuator apparatus on the first major surface of the support structure to the second major surface of the support structure for making electrical contact with the microactuator apparatus and the transducer.

26. The apparatus of claim 25 wherein the circuit further comprises circuit traces and the circuit traces form a zig-zag pattern.

27. The apparatus of claim 25 wherein the microactuator apparatus comprises at least one piezoelectric element.

28. The apparatus of claim 25 wherein the apparatus further comprises at least one aperture and the circuit is routed through the at least one aperture.

29. The apparatus of claim 28 wherein the circuit includes a bend in the circuit to route the circuit through the at least one aperture.

30. The apparatus of claim 29 wherein the bend is between 45 and 125 degrees.

* * * * *